No. 692,193. Patented Jan. 28, 1902.
O. CONGELTON.
WHEEL.
(Application filed Apr. 10, 1901.)
(No Model.)

Witnesses:
E. B. Bolton

Inventor:
Osborn Congelton
By Richards
his Attorneys.

UNITED STATES PATENT OFFICE.

OSBORN CONGELTON, OF PORT CHESTER, NEW YORK, ASSIGNOR TO AMERICAN ELEVATED RAILROAD COMPANY, OF NEW YORK, N. Y.

WHEEL.

SPECIFICATION forming part of Letters Patent No. 692,193, dated January 28, 1902.

Application filed April 10, 1901. Serial No. 55,119. (No model.)

*To all whom it may concern:*

Be it known that I, OSBORN CONGELTON, a citizen of the United States, and a resident of Port Chester, New York, have invented certain new and useful Improvements in Wheels, of which the following is a full, clear, and exact specification.

My invention relates to wheels of all kinds; and it consists, substantially, in providing a wheel having a flat tread with a groove or channel therein and a plurality of balls retained in said groove or channel and forming the sole flange of the wheel.

It is my object to avoid the use of the fixed or permanent flange now provided on wheels and supply in its stead a ball or roller guide.

Figure 1:
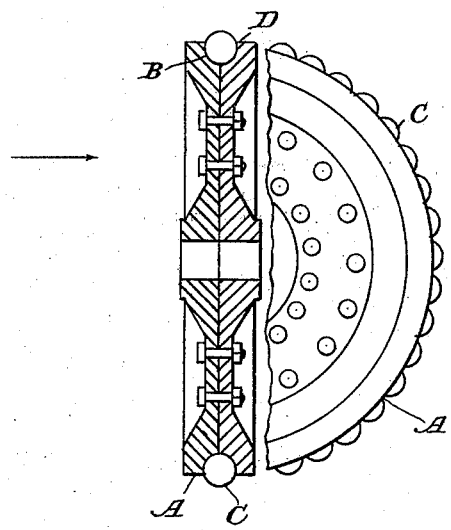
Figure 2:
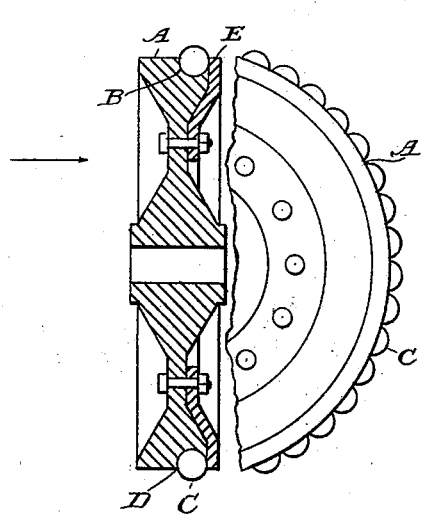
Figure 3:
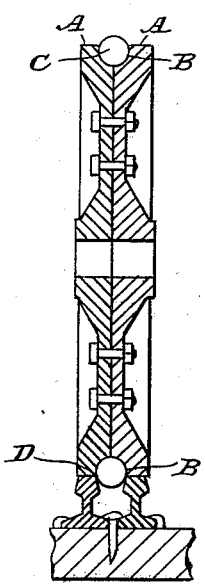
Figure 4:
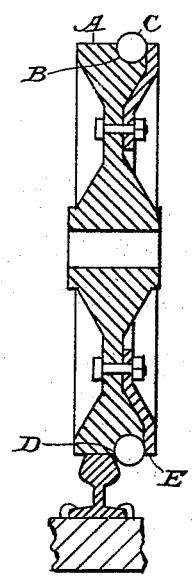

Referring to the accompanying drawings, in which like letters of reference indicate similar parts throughout the several views, Figure 1 is a front view of a wheel provided centrally with ball-bearings. Fig. 2 is a similar view with the bearings at the side of the wheel's periphery. Fig. 3 represents a double-track wheel with central bearings resting upon the track; and Fig. 4 is a single track, having a wheel with side bearings thereupon.

In the form shown in Fig. 1 of the drawings, A is the periphery of a wheel having a depression B at or about its central part. C represents the balls which form the roller-bearing and which rest in the depression B. The balls C are held in the groove snugly, but are allowed to revolve. The edges D of the groove or depression B are extended inwardly toward each other a short distance, just sufficient to hold the balls C in place without interfering with their free movement and covering as little of their surface as possible.

The form of my invention shown in Fig. 2 is the same in principle as that in Fig. 1, the only difference being that the ball-bearings are disposed at the side of the rim of the wheel instead of the middle part. In Fig. 2 A is the periphery of the wheel, flanged at E. The flange E extends over the balls C, which are held in the groove B by said flange. Similarly as in Fig. 1, as little of the bearing-surface of the balls C as possible is covered by the flange E.

I have found my invention to be of advantage and practical utility in all connections where wheels are used, but of particular importance when used in connection with elevated cars—*i. e.*, in cars where the tracks are laid on elevated or overhead trestlework.

Having now described my invention, what I claim, and desire to secure by Letters Patent, is—

A car-wheel having a flat tread with a groove or channel therein, and a plurality of balls retained in said groove or channel and forming the sole flange of the wheel, substantially as described.

In witness whereof I have hereunto set my hand in presence of two witnesses.

OSBORN CONGELTON.

Witnesses:
HENRY F. WEST,
OTTO MUNK.